(No Model.)  J. W. HYATT.  5 Sheets—Sheet 1.
ART OF FILTRATION.

No. 293,748.  Patented Feb. 19, 1884.

Fig 1.

WITNESSES:
Herman Gustow
William R. Ellison

INVENTOR
John W. Hyatt,
BY
Chas. C. Gill
ATTORNEY (No Model.) 5 Sheets—Sheet 3.

J. W. HYATT.
ART OF FILTRATION.

No. 293,748. Patented Feb. 19, 1884.

Attest:
Herman Gustow
William B. Ellison

Inventor:
John W. Hyatt,
By Chas. O. Gill
Attorney.

(No Model.) J. W. HYATT. 5 Sheets—Sheet 4.
ART OF FILTRATION.
No. 293,748. Patented Feb. 19, 1884.

Attest:
Herman Gustow
William D. Ollison

Inventor:
John W. Hyatt,
By his Attorney
Chas. P. Gill

UNITED STATES PATENT OFFICE.

JOHN W. HYATT, OF NEWARK, NEW JERSEY.

ART OF FILTRATION.

SPECIFICATION forming part of Letters Patent No. 293,748, dated February 19, 1884.

Application filed August 11, 1883. (No model.)

*To all whom it may concern:*

Be it known that I, JOHN W. HYATT, a citizen of the United States, and a resident of Newark, in the county of Essex and State of New Jersey, have invented certain new and useful Improvements in the Art of Filtration, of which the following is a specification.

The invention relates to an improvement in the art of filtration; and it consists, first, in the method of removing the impurities from the filter-bed in such manner that a small portion only of the whole filtering medium is subjected to the cleansing-process at the same time, which method consists in moving a current of filtering substance together with or by means of a stream of water from the lower to the upper part of the filter-bed, whereby the particles are separated and washed in transit and the impurities are carried off with the escaping water; second, in the method of removing the impurities from the filter-bed by continuous washing without interfering with the filtering process in such manner that a portion only of the filtering medium is subjected to the cleansing process at the same time, which method consists in moving a current of filtering substance together with or by means of a stream of water from the lower to the upper part of the bed, whereby the particles are separated and washed in transit and the impurities are carried off by the escaping water; and, third, in novel apparatus for giving effect to the process above specified.

In the employment of my invention, referring to the washing process, I move a current of the filtering elements, together with or by means of a stream of water, from the lower part of the bed and deposit it upon the upper part thereof, and in this way, after the process has been continued a short time, all of the elements of the filter-bed will have been displaced and the impurities separated therefrom and allowed to pass away with the escaping water.

Various means of creating or inducing the current of filtering elements, as above specified, will be apparent to those skilled in the art from the detailed description hereinafter presented.

In the drawings, the principal views illustrate a receptacle having one or more vertical tubes reaching from the lower part of the filter-bed to a point a short distance above the same, and a smaller pipe arranged to deliver a jet or stream of water immediately below the lower end of the said tube. The purpose of the jet of water is to induce a current of the elements of the filter-bed upward through the tube, rising over the top of which they fall upon the bed and are gradually lowered to the bottom part thereof again during the washing process.

I do not limit myself to the employment of the tube and jet-pipe as a means of transferring the elements of the filter-bed from the lower to the upper part of the same, although I have accomplished satisfactory results by the use of this construction. It is obvious, however, that the tube and jet pipe constitute nothing more or less than a convenient sand-pump, and this may be substituted by any mechanical appliances—such as the usual sand-pump now in use, or by a spiral shaft running through the transfer-tube, or by other devices which may be employed to attain a like result.

The nature and objects of the invention will be more fully understood from the description hereinafter presented, reference being had to the accompanying drawings, in which—

Figure 1:
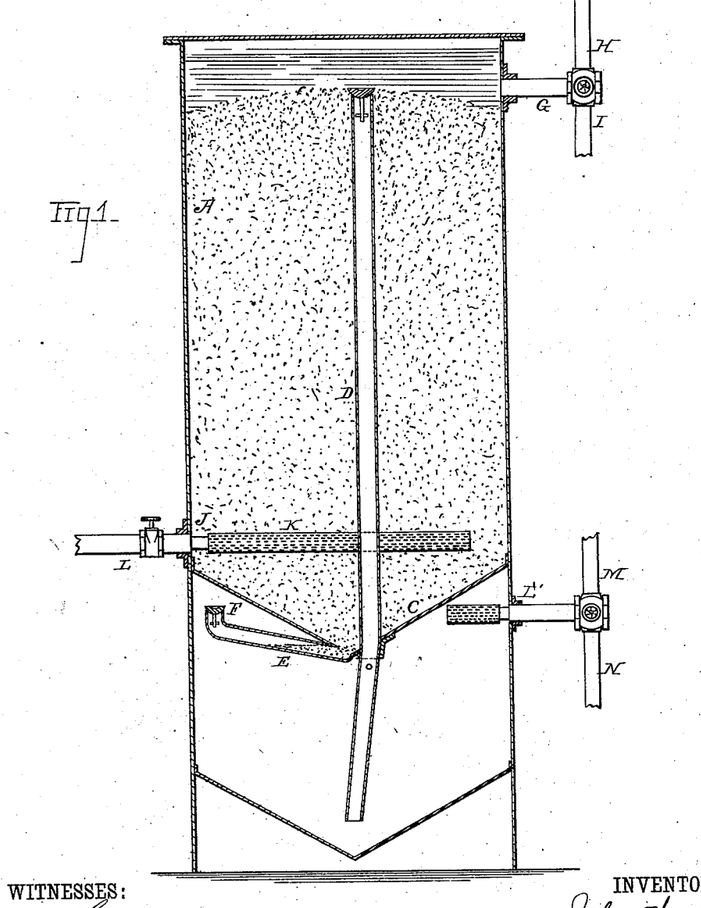
Figure 1 is a central vertical section of an apparatus embodying the elements of the invention.

Referring to Fig. 1 of the drawings, A denotes a cylindrical vessel having a base the interior surface of which is in the form of an inverted cone. Above this base there is secured across the entire body of the filter an inverted cone-shaped partition or diaphragm, C, whereby the filter is divided into two chambers, the upper one containing the bed of filtering material and the lower one to contain a portion of the said bed during the process of washing the same, as hereinafter described. From the lower part of the diaphragm C there extends outward the discharge-pipe E, having in its end an automatically-operating check-valve, F. About the central part of the apparatus is provided the vertical transfer-pipe D, which extends from the lower part of the inverted cone-shaped base to a point above the upper line of the filter-bed. The upper end of the pipe D will have an automatically-operating check-valve, which will permit the passage of the elements of the filter-bed and the water to be discharged from the upper end of the same and prevent the return into the said pipe at the upper end of the said elements. At the upper part of the apparatus is provided a pipe, G, connected by a three-way cock with the supply-pipe H and waste-pipe I, and from the lower part of the upper compartment of the apparatus is provided a delivery for filtered water, J, the same consisting of the perforated cylinder K, connected with the outlet-pipe L. In the lower part of the compartment of the filter, immediately below the diaphragm C, is provided an outlet-pipe, L', connected by a three-way cock with the inlet-pipe M and waste-pipe N, the entrance to the outlet-pipe L being by a perforated cylinder. That portion of the filter below the diaphragm C is of sufficient capacity to contain, say, about one-fourth of the filter-bed, the purpose being to allow about that quantity of the filtering medium to pass into the lower compartment and then be moved upward by means of a current of water through the transfer-pipe D and caused to fall upon the upper part of the bed. It will appear plain that if this operation is repeated four times—that is, if one-fourth of the filtering medium is allowed to enter the lower compartment and be transferred to the upper part of the bed for four successive times, the whole filter-bed will have been displaced, and in its displacement the foreign matter is detached from the particles of the filtering elements, and caused to pass away through the waste-pipes.

The discharge of the material from the lower to the upper part of the bed during the process of washing the same is accomplished in the following manner: The filtering medium being placed within the upper compartment of the apparatus, the process of filtering is continued until the bed has become foul from the arrested foreign matter, at which time the outlet-pipe L is closed and the waste-pipe N opened, the effect of this being that the water from the supply will carry a part of the elements of the filter-bed through the pipe E and fill the lower compartment of the filter, the water which passes with said elements being allowed to escape through the waste-pipe N. The three-way cock in the pipe L' is then turned so that the water from the inlet-connection M may pass into the lower compartment of the filter and create a pressure upon the filtering medium therein, and at the same time the three-way cock in the pipe G is turned so as to connect with the waste-pipe I, whereby the pressure created in the lower compartment and the rapid influx of the water into the pipe D will cause the filtering substance in said compartment to move up through the discharge-pipe D and be deposited upon the upper portion of the filter-bed, the foreign matter which is detached from the particles of the filtering medium during their passage through the pipe D being carried off with the water which is permitted to escape through the waste-pipe I. After this the three-way cock in the pipe L' is again turned, so as to connect with the waste N, and the three-way cock in the inlet-pipe G is turned to again permit the entrance of water to the filter-bed. The outlet J being still closed the pressure of the water now admitted through the inlet-pipe G will cause the lower compartment of the filter to be again filled with the elements of the bed, the water being allowed to escape through the waste-pipe N. The three-way cocks will then be again turned, so as to connect the inlet-pipe G with the waste-pipe I, and the pipe L' with the supply-pipe M, whereby the water of said supply-pipe will carry the elements of the filter-bed from the lower compartment upward through the transfer pipe D to the upper part of the bed, the waste water being allowed to escape with the impurities through the pipe I, as before. It will appear plain that one-half of the elements of the filter-bed have now been cleansed, and that upon repeating the operation, as above described, all of the filtering elements may be moved from the lower to the upper part of the bed and be cleansed in transit. After the filter-bed has been purified, the outlet-pipe L will be opened, the supply H connected with the inlet-pipe G, and the operation of filtering proceeded with as before. It will be seen that but a small portion of the elements of the filter-bed are subjected to the cleansing process at one time, and that the portion being acted upon is taken from the lower part of the bed and deposited in a cleansed condition upon the top of same. This result may be accomplished in various ways; and in the remaining figures of the drawings I have illustrated modified forms of apparatus for carrying my invention into effect.

Figure 2:
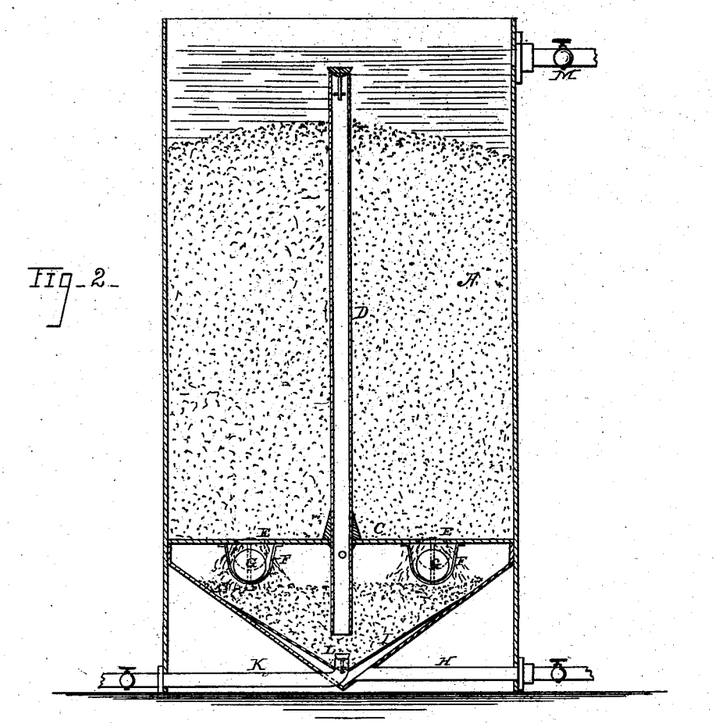
Fig. 2 is a similar view of a varied construction.
Figure 3:
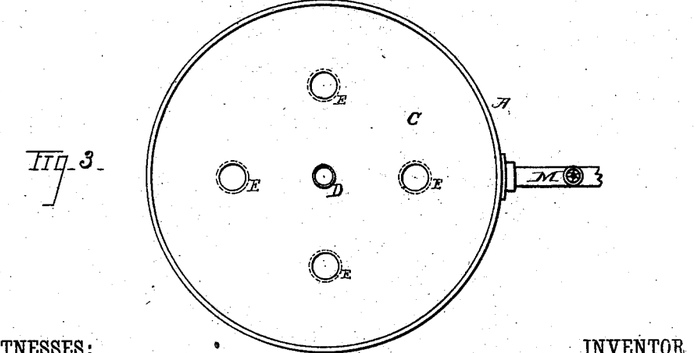
Fig. 3 is a top view of same.

Referring to Figs. 2 and 3 of the drawings, which illustrate a modified form of the invention, A denotes a cylindrical vessel having a base in the form of an inverted cone, the horizontal diaphragm or partition C sustaining at its center the vertical transfer-pipe D, which extends from the lower part of the inverted cone-shaped base to a point above the upper line of the filter-bed. In the diaphragm C are cut the apertures E, below which are suspended, in the frames F, the balls or check-valves G, which prevent the flow of water upward through the apertures E, and will preferably be of rubber and hollow within, so as to be easily moved upward or downward as pressure is exerted against them. Any suitable number of these check-valves may be employed according to the size of the filter and other circumstances, and their construction may be modified in minor details, if desired. In the lower part of the base of the filter is provided a delivery-pipe, H, protected at its mouth by perforated metal or wire-cloth I, arranged to form an inverted cone, a space being provided between the wire-cloth and the cone-shaped base, as indicated in Fig. 1. The perforated material I will support the sand and form a space, in which the water may accumulate and pass into the delivery-pipe H. Below the lower end of the transfer-pipe D is arranged a supplemental pipe, K, provided at its mouth with an automatically-operating check-valve, L, the purpose of this pipe being to afford a means whereby a jet or stream of water may be issued adjacent to the lower end of the pipe D, whereby a current upward through the said pipe of the elements of the filter-bed may be facilitated.

In the upper part of the filter is provided a pipe, M, which may be used for the entrance of water to be filtered, or for an escape of the water used in washing the filter-bed. Within the filter will be placed the bed of filtering material, which will be in granular or comminuted form, and will fill the space below the diaphragm or partition C and extend upward above the same to a point a short distance below the upper end of the transfer-pipe D. The purpose of the conical-shaped base of the filter is to direct the elements of the filter-bed downward to the lower end of the transfer-pipe D during the process of washing the same, whereby all of the said elements will be caused to move upward through the said pipe and be cleansed.

In the operation of the filter above described the water to be filtered enters through the pipe M, thence it descends through the bed of filtering material, and escapes by way of the delivery-pipe H, the water in its passage being cleansed of silt and other impurities. The pressure of the water in the body of the apparatus will depress the rubber balls G, and then pass through the apertures E and the perforated metal or wire-cloth I into the delivery H. After the process of filtering has been continued for a given length of time, which will depend upon the condition of the water, the bed of filtering material will have become foul from the arrested silt and other impurities and will require washing. This may be accomplished by closing the pipe H, connecting the pipe M with a suitable waste-delivery, and allowing the water to enter the filter through the pipe K, the effect of which is to create a current of water and the elements of the bed of filtering material from the lower compartment of the filter upward through the pipe D, and during the passage of the elements with the water through the pipe they are brought into contact with each other and with the sides of the pipe and the water, and the impurities are thereby detached and allowed to escape with the waste water through the pipe M.

It will appear obvious without a detailed explanation that the delivery-pipe, instead of being below the diaphragm C, may be situated above the same and be protected from the elements of the bed of filtering material by the perforated metal or wire-cloth, which may extend into the body of the filter or be arranged in any suitable manner to secure the accumulation and the free entrance to the delivery-pipe of the purified water.

Figure 4:
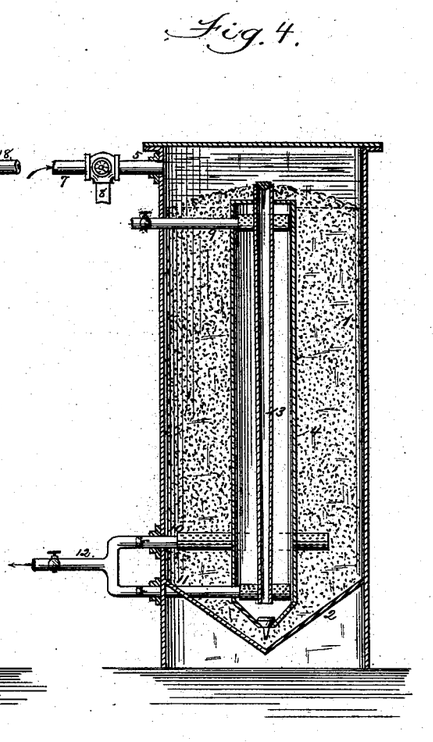
Figs. 4, 5, 6, 7, and 8 are similar views of modified forms thereof.

In Fig. 4 the modified form of apparatus consists of the casing 1, having an inverted cone-shaped base, 2, and a central transfer-pipe, 3, arranged within a cylinder or tube, 4, having an automatically-operating check-valve in its base. The inlet to the cylinder 1 for the water to be filtered is indicated by the numeral 5, and is supplied with a three-way valve connecting with the supply-pipe 7 and a waste-pipe, 8. There is an inlet-pipe, 9, to the upper part of the tube or cylinder 4, the said pipe having upon its end a perforated head for permitting the issuance of the water from the pipe and preventing the entrance thereto of the elements of the filter-bed. In the lower part of the apparatus is provided an outlet, 10, from the filter proper, and an additional outlet, 11, from the tube or cylinder 4, both being connected with one common delivery, 12, automatically-operating check-valves being arranged in the outlet-pipes 10 and 11, which move outward and are adapted to permit the passage of the water from the outlet-pipes to the delivery 12, but at the same time preventing any return through either of the outlets. The upper end of the filter-casing 1 is closed, and the tube or cylinder 4 is closed, except when the check-valve at its lower end is open. The elements of the filter-bed, whatever they may be, are placed within the casing 1 and the cylinder 4, and the operation of filtering proceeded with. The filtering elements may be placed in the cylinder 4 in the manner hereinafter specified with respect to the washing of the bed; and it will be observed that the filtering medium within the cylinder 4 may be utilized for filtering liquids the same as that portion of the filter-bed between the cylinder 4 and outer casing. After the bed has become clogged with the foreign matter arrested from the water it may be cleansed by successively moving a definite quantity of the filtering medium into the tube or cylinder 4 and then transferring the same upward through the pipe 3 and depositing it upon the upper part of the bed, the impurities being detached in transit and allowed to escape with the water through the waste-pipe 8. This operation I accomplish as follows: I first connect the waste-pipe 8 with the pipe 5; then close the delivery-pipe 12 and permit the entrance of the water from the pipe 9 to the cylinder 4. The pressure of the water in the cylinder and its rapid escape into the pipe 3 will move the filtering elements inclosed in said cylinder upward through the transfer-pipe 3, being discharged from the upper end of the said pipe and being permitted to fall upon the remaining portions of the filter-bed within the casing 1, the water and impurities being allowed to escape by way of the waste-pipe 8. After the contents of the cylinder 4 have been discharged and washed, the pipe 9 will be connected with a suitable waste, and the pipe 5 will be connected with the supply-pipe 8. The increased pressure of water in the casing will open the check-valve in the base of the tube or cylinder 4, when the water and elements of the filter-bed will rapidly fill the said tube, the water which enters with the filtering medium being allowed to escape through the pipe 9. After the tube or cylinder 4 has become filled with water and the elements of the filter-bed, I connect the pipe 9 with a supply of water and connect the pipe 5 with a waste, 8. The pressure of the water from the pipe 9 in the upper part of the cylinder or tube 4 will close the automatically-operating check-valve in the lower part of the tube and discharge the water and filtering medium inclosed therein through the pipe 3, upon the remaining portions of the filter-bed within the casing 1, as described above, the water and impurities being allowed to escape by way of the waste-pipe 8. After this the pipe 7 is connected with the pipe 5 and the operation above described of filling the tube 4 and then discharging its contents upward through the transfer-pipe 3 is again repeated, and by these successive operations the entire elements of the filter-bed will be effectually cleansed and the impurities carried away with the escaping water. Those portions of the filter-bed which remain within the tube or cylinder 4 after the cleansing process has been finished may be utilized for filtering by merely permitting the entrance of the water through the pipe 9 to the upper part of the same and allowing its escape through the pipe 11 to the delivery 12. The water to be filtered which passes through the main part of the bed enters through the pipe 5 and escapes into the delivery 12 through the outlet 10.

Figure 5:
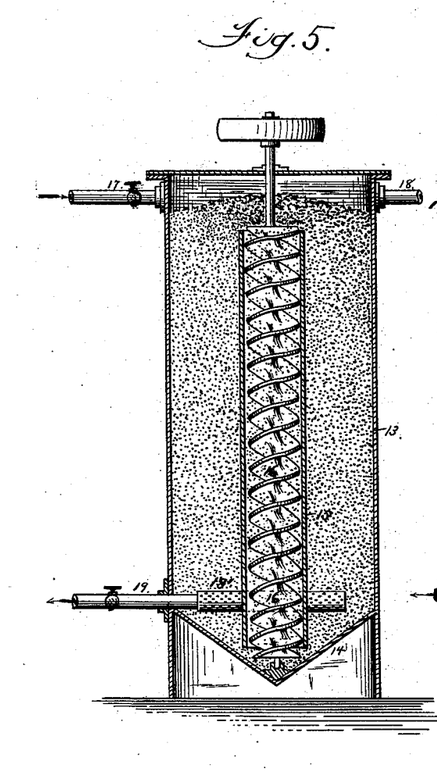

In Fig. 5 I illustrate another embodiment of my invention, in which the elements of the filter-bed are cleansed by transferring a portion of the same from the lower to the upper part of the bed, the impurities being allowed to escape at the upper part of the filter with a current of water substantially in the manner specified in relation to the other filtering apparatus and processes described in this application.

I have introduced this form of filter, Fig. 5, to illustrate that the movement of a current of the filtering elements with a body of water from the lower to the upper part of the bed may be facilitated by mechanical means. It is true that, in a majority of instances, the rapidly-flowing stream of water will be entirely sufficient to carry the elements of the filter-bed upward through the transfer-pipe; but I reserve the right to facilitate the operation by mechanical means, if that should become necessary. The cylinder 13 has a conical base, 14, and central transfer pipe or tube, 15, inclosing a spiral shaft, 16, which will be rotated by a suitable pulley, crank, or otherwise. The filter has an inlet-pipe, 17, and a waste-pipe, 18, at its upper end, and at its lower portion an outlet is provided, consisting of the perforated cylinder or cylinders 18' and the delivery-pipe 19. In the operation of the filter, when it is desired to cleanse the filter-bed, the outlet 19 is closed and the waste-pipe 18 opened. The spiral shaft 16 is then rotated, and it will move a current of the elements of the filter-bed and water from the lower to the upper part of same, the impurities and unclean water being carried off through the waste 18. The sand or other material of which the filter-bed is composed is brought into frictional contact with the water and with the sides of the tube 15 and blades of the shaft 16, and the impurities are thereby detached and separated and carried away with the escaping water.

The filter illustrated in Fig. 6 consists of a casing, N, having an inlet, O, and an outlet, P, the inlet and outlet being protected by sections of perforated metal, lettered Q R, respectively, that lettered R being considerably below the upper surface of the bed of filtering elements S. The casing N is provided at its top with a waste-trough, T, and delivery U, and contains a vertical transfer pipe or tube, V, supplemented by a jet-pipe, W. The jet-pipe W may be provided, if desired, with perforated subordinate arms or smaller pipes, X, through which jets of water can be issued into the lower parts of the filter-bed, and thus loosen the same and facilitate its passage into the central transfer-pipe, V.

Figure 6:
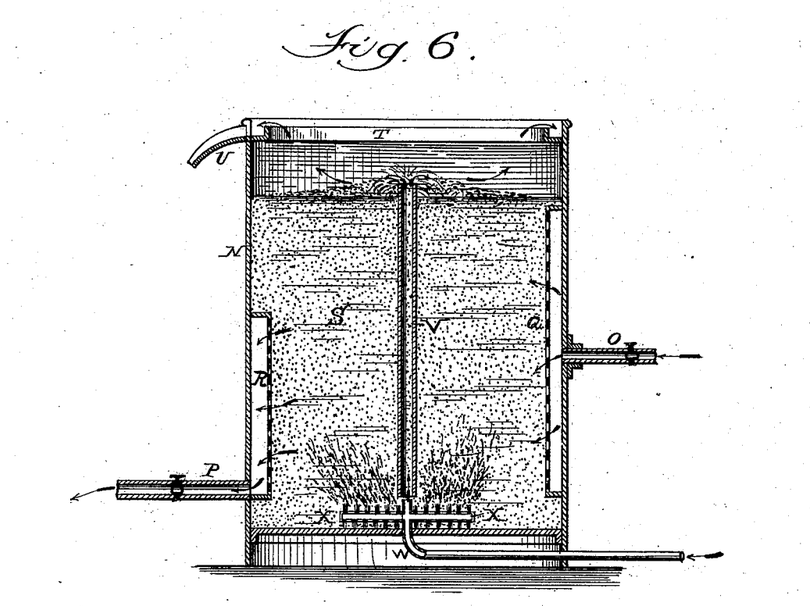

In the operation of the filter illustrated in Fig. 6 the water enters through the pipe O, thence it passes through the perforated section Q and the bed of filtering material, and finds its way into the perforated section R, and is delivered by the pipe P.

In the process of washing the filter-bed the inlet and outlet are closed and the water permitted to enter through the jet-pipe W, whereby a current of the elements of the filter-bed is induced upward, together with the water, through the central washing-pipe, V, the impurities detached therefrom and permitted to escape with the water into the trough T and waste-delivery U. The washing process will be continued until the entire elements of the bed have passed upward through the pipe V and fallen over the sides thereof, when it may be discontinued, or the washing process may be made continuous, as desired, by continuing the flow of water into the pipe W without closing the inlet to and outlet from the filter.

Figure 7:
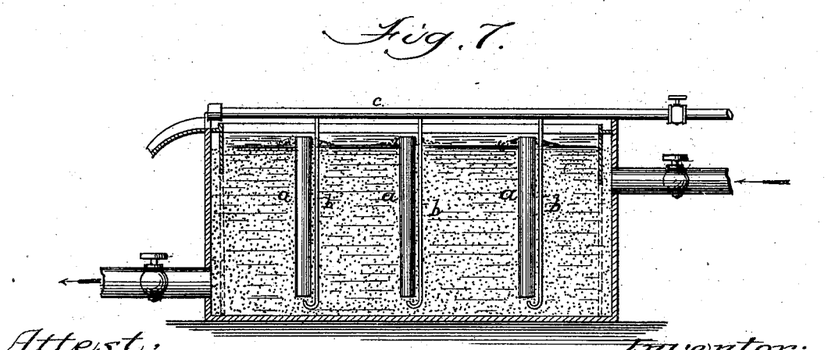

In Fig. 7 I illustrate a rectangular-shaped filter having a suitable supply and delivery, and provided with a series of vertical transfer-pipes, a, extending from the lower to the upper part of the bed, and each provided with a separate jet-pipe, b, connected with a common supply-main, c, and having also a proper waste-trough at its upper edge. In the process of washing the filter-bed in this apparatus the supply and delivery are closed, and the water from the pipe or main c is allowed to pass downward through the jet-pipes b, whereby currents of water carrying the elements of the filter-bed are created upward through the transfer-pipes a, with the result above described, the impurities and waste water being allowed to escape by means of the trough.

Figure 8:
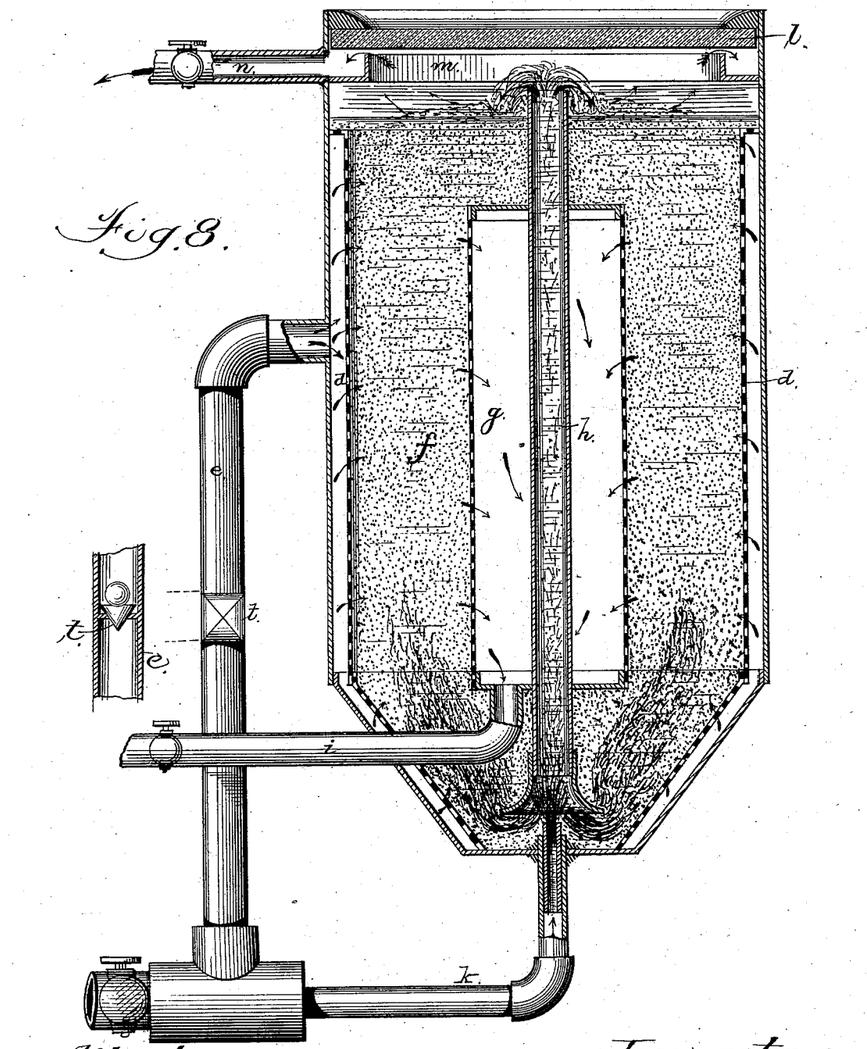

In Fig. 8 I illustrate a modified form of the invention, and in this filter I employ the outer casing, the transfer-pipe, and a jet-pipe, with a proper supply and delivery, as in the modifications before described. Within the casing is a perforated lining, d, and the water to be filtered enters through the pipe e, between the casing and lining, and issues thence through the bed of filtering material f into the perforated cylinder g, which is completely covered by the filter-bed, and, for convenience, encompasses the central transfer-pipe, h. The discharge-pipe i connects with the perforated cylinder g and conducts the purified water from the apparatus. The supply-pipe e, for the water to be filtered, and jet-pipe k, for washing the filter-bed, are connected by a suitable elbow, so that the water for both the pipes e and k may issue from a common supply. In the pipe e is provided a loaded valve, t, being an ordinary loaded or weighted check-valve, as indicated in section, by which the flow of the water in the said pipe e has a resistance of, say, five pounds pressure to the square inch. Thus it will be seen that the water will flow more freely into the pipe k than through the pipe e, and that the jet issuing from the pipe k will, as a consequence, have a greater upward force than the stream coming from the pipe e. The upper end of the filter-casing may be provided with a glass covering, l, to permit of the inspection of the interior of the filter during its operation. This embodiment of the invention will also be provided with an overflow-trough, m, and a waste-outlet, n, as in the other embodiments described hereinbefore. By means of the perforated lining d the water to be filtered may pass entirely around the casing and find numerous inlets to the filter-bed. The flow of the water is clearly indicated by the arrows in the drawings. In the operation of this apparatus the current of the filtering agent and the liquid is permitted to enter through the central pipe, h, the impurities passing off with the water through the trough m and waste-outlet n, while at the same time the water to be filtered passes to the exterior of the perforated cylinder g, through which it issues and escapes in a purified condition through the delivery-pipe i. Any suitable number of pipes or tubes h may be placed in the perforated cylinder g, according to the size of the filter-bed, and any convenient number of perforated cylinders g may be employed in a single outer casing, according to the quantity of water to be filtered within any given time and other circumstances. The lower part of the filter illustrated in Fig. 8 is in the form of an inverted cone, in order to direct the elements of the filter-bed toward the lower end of the transfer-pipe h.

In connection with this application, I beg to call attention to my applications No. 96,361, filed May 28, 1883, and No. 102,472, filed August 1, 1883, in the former of which I describe a method of cleansing filter-beds composed of coarse and fine agents by transferring the filter-bed from one compartment to another, the fine agent and the impurities being carried away with the escaping water; and in the latter of said applications I describe a filter in which the granular filter-bed, in the process of washing the same, is transferred from one compartment to another, the impurities are carried away by the waste-water, and the bed then returned to the filter proper. The subject-matter of the two above-mentioned applications is not claimed herein.

What I claim as my invention, and desire to secure by Letters Patent, is—

1. In cleansing granular filter-beds, the method of removing the impurities therefrom in such manner that a small portion only of the whole body of the filtering medium is subjected to the cleansing process at the same time, which method consists in moving a current of the filtering substance, together with a stream of water, from the lower to the upper part of the filter-bed, whereby the particles are separated and washed in transit and the impurities are carried off with the escaping water, substantially as set forth.

2. In cleansing granular filter-beds, the method of removing the impurities therefrom by a continuous washing without interfering with the filtering process, which method consists in moving a current of the filtering substance, together with a stream of water, from the lower to the upper part of the bed without checking the flow of the liquid to be purified, whereby the particles are separated and washed in transit, and the impurities are carried off by the escaping water without interfering with the filtering process, substantially as set forth.

3. A filter consisting of the outer casing having a supply and delivery, a filter-bed composed of material in granular or comminuted form, and a pipe or tube passing through the bed adapted to transfer the material from the lower to the upper part thereof by means of a stream of water, whereby all of the elements of the bed are displaced and cleansed, the impurities being allowed to escape with the waste water, substantially as set forth.

4. A filter consisting of the outer casing, the bed of filtering material in granular or comminuted form, a supply and delivery, a transfer pipe or tube, and means for moving the elements of the filter-bed, together with a stream of water, from the lower and depositing it upon the upper part of the same, through said pipe or tube, in process of washing the bed, substantially as set forth.

5. In a filtering apparatus containing a bed of filtering material in granular or comminuted form, and a supply and delivery, a transfer pipe or tube, and a jet-pipe placed directly below the lower end of said pipe or tube, by which a current of water carrying the elements of the filter-bed is induced upward through the tube, substantially as set forth.

6. In a filtering apparatus, the outer casing, the bed of filtering material in granular or comminuted form, the central transfer pipe or tube, the jet-pipe placed directly below the lower end of transfer pipe or tube, and overflow-trough, substantially as set forth.

Signed at New York, in the county of New York and State of New York, this 28th day of July, A. D. 1883.

JOHN W. HYATT.

Witnesses:
CHAS. C. GILL,
HERMAN GUSTOW.